United States Patent [19]

Eggleston

[11] Patent Number: 5,806,871
[45] Date of Patent: Sep. 15, 1998

[54] VEHICULAR TRAILER

[76] Inventor: James F. Eggleston, 2102 LA Hwy. 726, Carencro, La. 70520

[21] Appl. No.: 689,440

[22] Filed: Aug. 12, 1996

[51] Int. Cl.$^6$ ........................................................ B60P 3/10
[52] U.S. Cl. ........................................ 280/414.1; 280/475
[58] Field of Search ................................. 280/414.1, 475; 248/188.6, 688, 351, 393, 420, 163.2, 465, 133; 482/142

[56] References Cited

U.S. PATENT DOCUMENTS

| | | | |
|---|---|---|---|
| 3,190,674 | 6/1965 | Carter | 280/414.1 |
| 3,643,907 | 2/1972 | Ham | 248/188.6 |
| 3,883,159 | 5/1975 | Whitley, Jr. | 280/414.1 |
| 3,989,276 | 11/1976 | Hamerl | 280/475 |
| 4,434,995 | 3/1984 | Toy | 280/414.1 |
| 4,779,888 | 10/1988 | Raymond | 280/414.1 |
| 5,190,513 | 3/1993 | Habing et al. | 482/142 |
| 5,529,558 | 6/1996 | Koenig | 482/142 |

*Primary Examiner*—Daniel G. DePumpo
*Attorney, Agent, or Firm*—John D. Jeter

[57] ABSTRACT

A vehicular trailer has a retractable skid provided for each side of the trailer to extend parallel to the axis of symmetry of the trailer from a position aft of the hitch to a position just forward of the wheels. The skids pivot vertically from a point at the forward end so that the back end of the skids can be lowered and braced to support the trailer and prevent the wheels dropping over the edge of supporting surfaces and becoming jammed against forward movement. Braces extend upward from the skids to the trailer frame when the skids are lowered.

7 Claims, 3 Drawing Sheets

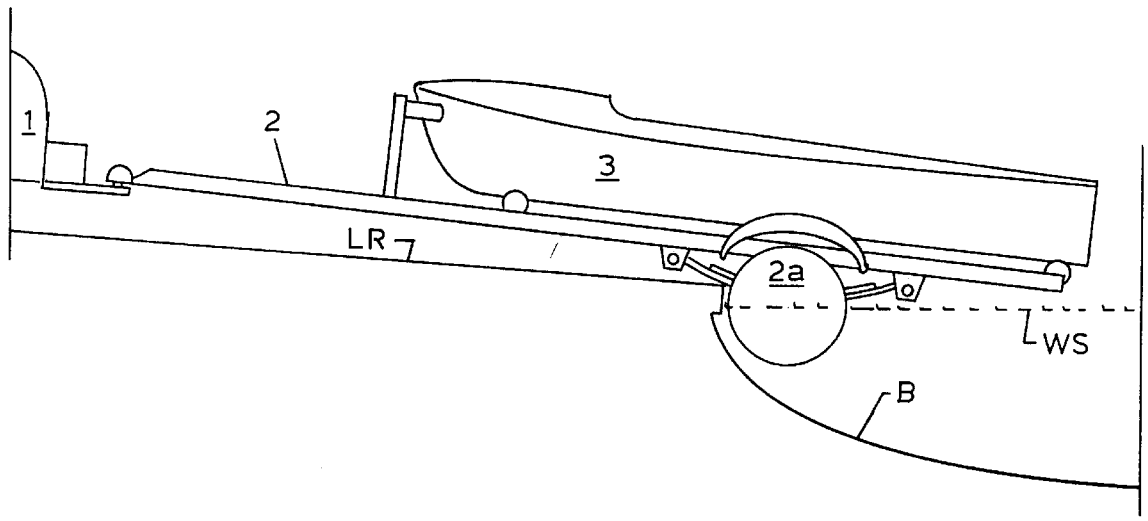
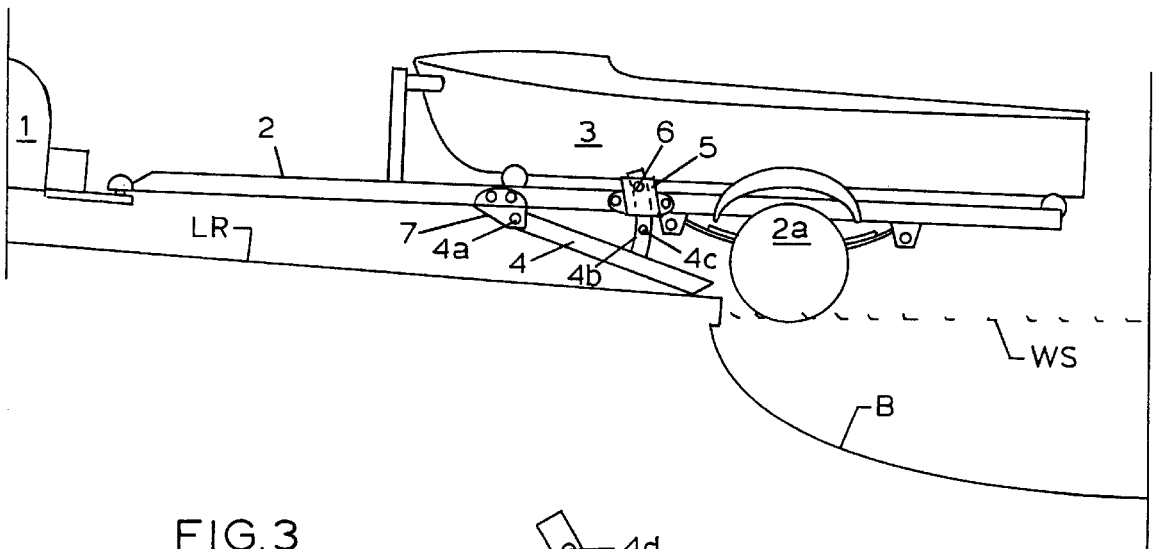
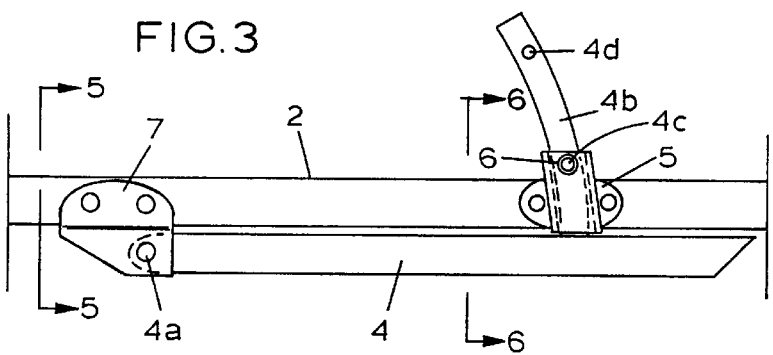

VEHICULAR TRAILER

This invention pertains to vehicular trailer improved by apparatus for supporting the trailer after the wheels have dropped over a ledge formed by the end of a launching ramp or the like. More specifically it pertains to a trailer with retractable skid structure that can be lowered for trailer support and raised for trailer transport.

BACKGROUND OF THE INVENTION

Launching and recovering boats into and from water bodies presents problems when erosion has removed soil at the end of boat launching ramps. The wheels of the trailer tend to drop over the edge of the ramp such that the edge of the ramp engages the wheels near their axle level when recovering the trailer with a towing vehicle. The resulting resistance to forward movement usually stalls the towing vehicle and may damage structure from the hitch rearward along the trailer frame. Forward of the wheels a spring shackle is common and projects downward from the frame and invites damage.

There is a need for a skid removably attached to the trailer that will engage the edge of a boat launching ramp, or similar obstruction, to lift the trailer during the forward movement of the trailer when the wheels and spring shackles approach the ramp edge.

Normal use of the usual boat trailer would bring a fixed skid, suitable for boat launching into ground contact with jarring effect during road transport and the skid needs to be lifted up to be near the frame for road transport.

It is therefore an object of this invention to provide a retractable skid attachment to the trailer frame for downward extension to support the trailer if the wheels lose ground support when the trailer is in the vicinity of the launching and recovery activity.

It is a further object of this invention to provide a skid that pivots from a fixed attachment axis on the trailer frame to support the trailer if the wheels lose ground support when the trailer is in the vicinity of the launching and recovery activity.

These and other objects, advantages, and features of this invention will be apparent to those skilled in the art from a consideration of this specification, including the attached claims and appended drawings.

SUMMARY OF THE INVENTION

A trailer with a retractable skid is provided for boats and the like that may be used under circumstances that allow the wheels to drop over ledges such as boat launching ramps from which recovery is hampered by wheel engagement against the ramp to resist forward movement. A retraction arrangement is preferred and a pivot support is attached to each side of the trailer frame from which a skid is attached to each to extend rearward. The skids pivot from the support for raising the aft end of the skid for travel and for lowering the aft end of the skid for boat launching and the like. To brace and support the aft end of the skid a brace member extends upward from the skid to engage a brace bracket attached to the trailer frame. The brace member is preferably pinned to the bracket by a cross pin that extends through cross bores in the member and in the bracket. There are two hole positions available, one for the raised position and one for the lowered position. When the skid is lowered and the wheels fall over a ledge the skid engages the ground and supports the trailer and skids along the ramp to complete launching and recovery. The front of the pivot support is slanted to prevent jamming on ramp structure. Alternatively, the skid may be supported toward the rear by a pivotable brace when the skid is lowered. The brace is secured to the trailer frame by a mechanical link, elastomer bands, or the like when the skid is raised. The elastomer band, if used, holds both skid and link in a raised position.

BRIEF DESCRIPTION OF DRAWINGS

In the drawings wherein like features have similar captions, FIG. 1 is a side view of the usual trailer without the skid herein disclosed, in the situation this invention is intended to avoid.

FIG. 2 is a side view of the same boat now provided with the skids of this invention providing the service intended.

FIG. 3 is a side view, rather enlarged, of part of the view of FIG. 2, showing the skid arrangement, in the raised position, in more detail.

DETAILED DESCRIPTION OF DRAWINGS

Figure 4:
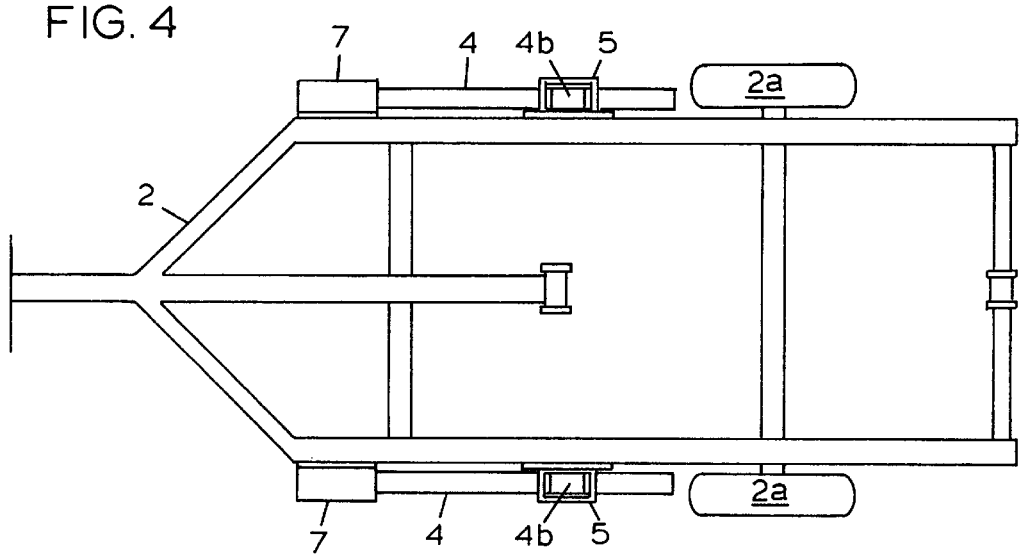
FIG. 4 is a top view of the trailer, without a boat loaded, showing the lateral distribution of the novel skid arrangement.

In the drawings some features common to the construction art, such as weld lines, and not bearing upon points of novelty are omitted in the interest of clarity and descriptive efficiency.

FIG. 1 shows a boat trailer 2, with boat 3 loaded, extending over the edge of a launching ramp LR, that has experienced erosion that has removed bottom soil to leave the boat wheels 2a trapped by the resulting ramp ledge. The wheels will jam against the ledge and will not lift the trailer when it is pulled forward. The water surface WS and the sloping bottom B makes assisting the boat by lifting and pushing rather difficult and the tow vehicle 1 will commonly stall. Ramp LR, water surface WS, and bottom B are shown a typical profiles in boat launching situations.

FIG. 2 shows the same trailer 2 and launching situation as FIG. 1, with the novel skid 4 attached, and the wheel 2a is supported by the skid such that forward movement will not jam the wheels 2a against the ramp ledge. The skids are normally lowered before the trailer is backed into the water but the skids can be readily lowered after the problem is encountered.

FIG. 3 is an enlarged portion of the trailer frame with enough structure shown to fully disclose the skid related structure. Pivot bracket 7 is shown bolted to the frame 2. Skid 4 pivots about cross pin 4A. Brace 4b is welded to the skid to extend upward through a tubular bore in brace bracket 5 and is pinned by cross pin 6 which extends through a cross bore in the bracket and cross bore 4c in the brace. The brace bracket is shown bolted to the frame 2 but it can be welded on or clamped on by "U" bolts. As shown in FIG. 3, at the right (aft) end of skid 4, there is an upwardly sloped skid surface extending between the lower and upper surfaces of the skid.

FIG. 4 is a top view of the trailer shown in FIG. 2 (no boat shown) and shows the lateral distribution of the skids and related brackets. Trailer frames differ in construction and the one shown may be considered typical or symbolic. Parallel frame members commonly extend the general length of the boat but differ in fore end hitch approach treatment. The novel skids can be accommodated by the usual parallel frame portion of the trailer. Pivot and brace brackets can be bolted or welded to the trailer frame. Some trailer frames are heavily galvanized and bolting on is preferred. The skid related stricture itself may be heavily galvanized which discourages welding.

Figure 5:
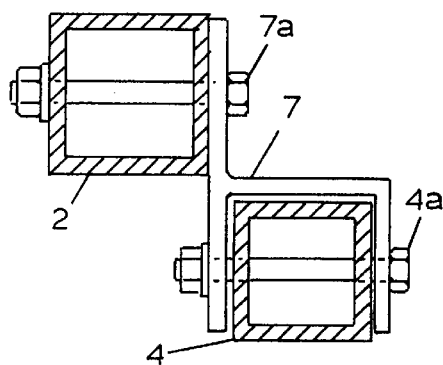
FIG. 5 is a sectional view, rather enlarged, taken along line 5—5 of FIG. 3 showing the front attachment system.

FIG. 5 is a section taken along line 5—5 of FIG. 3. Bracket 7 is secured by bolts to trailer 2 and supports skid 4 for pivoting about pin 4a.

Figure 6:
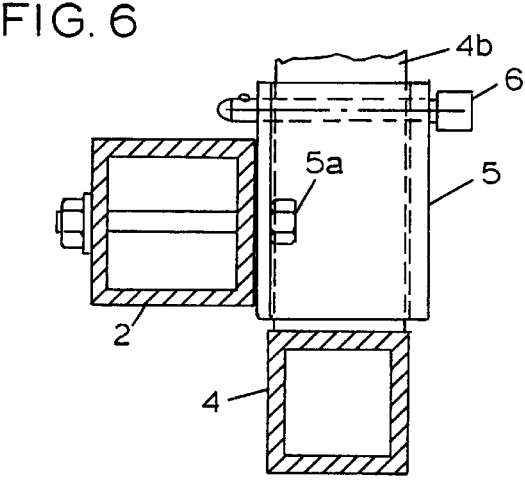
FIG. 6 is similar to FIG. 5 but taken along line 6—6 of FIG. 2.

FIG. 6 is a section taken along line 6—6 of FIG. 3. Brace 4b is welded to the top of skid 4.

Figure 7:
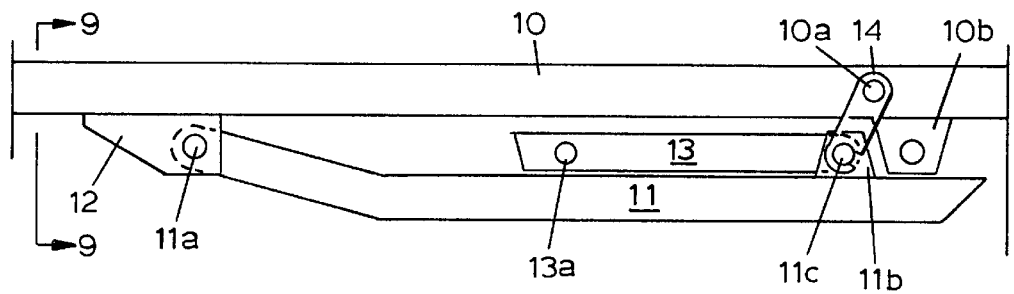
FIG. 7 is a side view, similar to that of FIG. 3, showing an alternate form of skid aft end support raised for trailer transport.

FIG. 7 shows an alternate brace arrangement to support the aft end of the skid 11. Pivot bracket 12 is attached welding shown, to frame 10 to pivotably support skid 11 on cross pin 11 a. In this stowed position brace 13, pivotably mounted on brace bracket 11b by stud 11c, is carried above the skid which is supported in the raised travel position by link 14 which is mounted on stud 10a and hooks on stud 11c attached to the skid.

Figure 8:
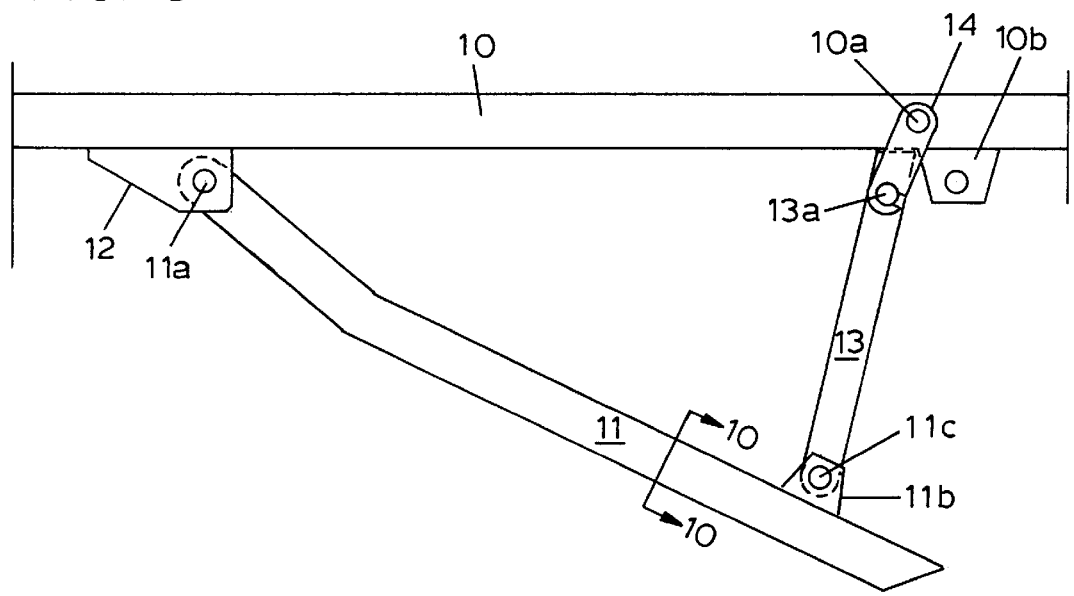
FIG. 8 is a side view similar to FIG. 7 showing the alternate skid lowered for trailer support.

FIG. 8 shows the same arrangement as FIG. 7 with the skid 11 lowered for launching. The brace 13 is stabilized against the spring shackle bracket 10b and the brace is held in position by the link 14. If the spring shackle bracket is not appropriately positioned, a substitute lug can be welded or bolted in the position of the shackle bracket shown to position the brace.

Figure 9:
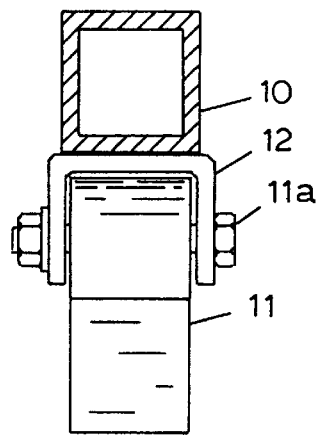
FIG. 9 is a sectional view, somewhat enlarged, taken along line 9—9 of FIG. 7.

FIG. 9 is a sectional view, somewhat enlarged, taken along line 9—9 of FIG. 7. With this option skid 11 can be conveniently located tinder the trailer frame longitudinal beams.

Figure 10:
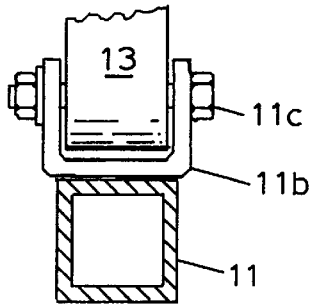
FIG. 10 is a view similar to FIG. 9 taken along line 10—10 of FIG. 8.

FIG. 10 is a sectional view taken along line 10—10 of FIG. 8. The skid 11 is shown as a square tube. Brace 13 can be of similar form.

Figure 11:
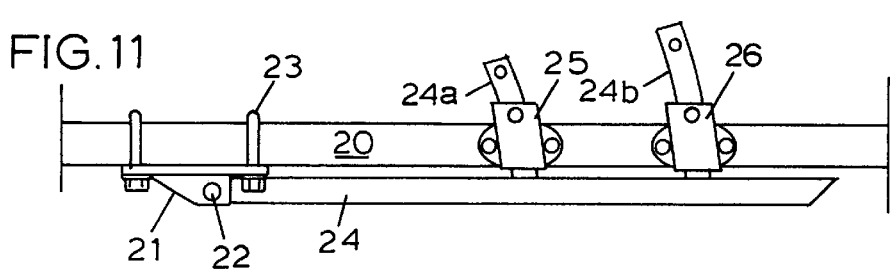
FIG. 11 is a side view similar to FIG. 3 as an alternate form for larger trailers.

FIG. 11 is a side view of an alternate skid arrangement showing only enough trailer structure to display the skid related elements. This differs from the skid of FIG. 3 only in the provision of an intermediate brace for skid 24. Pivot bracket 21 is secured to the trailer frame by "U" bolts 23. Brace brackets 25 and 26 are bolted to trailer frame 20. Brace 24a has length and hole spacing, relative to brace 24b, proportional to the distance from pivot pin 22. Other than the presence of two braces, the functional description for FIG. 3 applies.

From the foregoing, it will be seen that this invention is one well adapted to attain all of the ends and objects hereinabove set forth, together with other advantages which are obvious and which are inherent to the tool.

It will be understood that certain features and sub-combinations are of utility and may be employed without reference to other features and sub-combinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described,

I claim:

1. A vehicular trailer with a skid attachment, with a fore and an aft end, to provide a skid on each side of the trailer frame forward of the wheels, and aft of a fore end hitch, to support the trailer when the trailer wheels drop over the edge of a supporting ramp to prevent the wheels from becoming lodged against the ramp when the trailer is moved forward, the trailer comprising:

a) a vehicular trailer with a frame and a fore end hitch with at least two laterally separated wheels;

b) a pair of pivot brackets for attachment, one on each side, to the trailer frame at a location between the trailer wheels and the trailer hitch;

c) a pair of elongated skids, one for each side of said trailer, with an upper and a lower surface and a fore and aft end, said fore end including means for pivotal attachment to said pivot bracket, an upwardly sloped skid surface between said lower and said upper surfaces terminating said aft end, and an upwardly extending elongated brace projecting generally upward from said upper surface some distance forward of said aft end;

d) a pair of brace brackets, one for each side of said frame, arranged for attachment to said trailer frame with first means to accept and secure said brace to said brace bracket when said skid is pivoted upward near said frame for travel and second means to accept and secure said brace to said brace bracket when said skid is pivoted downward to engage the ground to support said trailer.

2. The trailer of claim 1 wherein said brace bracket means to accept comprises a tube to receive said brace.

3. The trailer of claim 2 wherein both said means to secure comprises at least one first cross bore through said tube and at least one second mating cross bore in said brace to accept a transverse pin extending through said cross bores.

4. An improved vehicular trailer with a frame, a fore end with a hitch, and at least two laterally spaced wheels;

the improvement comprising;

a) a skid attachment, with a fore and an aft end, to provide a skid on each side of said trailer frame forward of the wheels, and aft of the fore end hitch, to support the trailer when the trailer wheels drop over the edge of a supporting ramp to lift the trailer to prevent the wheels becoming lodged against the ramp when the trailer is moved forward, the skid attachment comprising:

b) a pair of rival brackets for attachment, one on each side, to the trailer frame at a location between the trailer hitch;

c) a pair of elongated skids, one for each side of said trailer, with an upper and a lower surface and a fore and aft end, said fore end with means for pivotal attachment to said pivot bracket, and an upwardly sloped skid surface terminating said aft end;

d) a pair of brace brackets, one for each side of said frame, arranged for attachment to said trailer frame with means to support a downwardly extending brace member;

e) a pair of elongated brace members, one for each said skid, pivotably attached to said skid situated to pivot toward a generally horizontal position for travel and to pivot to extend generally upward to engage said frame to support said frame from the ground when said skid is lowered;

f) means to support and secure said skid aft end to said frame in a generally horizontal position for travel.

5. The trailer of claim 4 wherein said means to support comprises a releasably secured connecting member to suspend said skid from said frame.

6. The trailer of claim 4 wherein said brace is secured in a generally horizontal position by confinement between said frame and said skid when said skid is lifted for travel.

7. A wheeled cargo trailer with a frame, having a fore and an aft end, for towing behind a vehicle by a fore end hitch and having a retractable skid arrangement on each side of the trailer frame forward of the wheels, and aft of the hitch, to provide ground support for the trailer when the trailer wheels drop over the edge of a supporting surface to lift the trailer to prevent the wheels becoming lodged against a surface obstruction when the trailer is moved forward, the skid arrangement comprising:

a) a pair of pivot brackets for attachment, one on each side of the trailer, to the trailer frame at a location between the trailer wheels and the hitch with means for pivotably supporting said fore end of said skid;

b) a pair of elongated skids one for each side of said trailer, with an upper and a lower surface and a fore and aft end, said fore end with means for pivotal attachment to said pivot bracket, an upwardly sloped skid surface between said lower and said upper surfaces terminating said aft end;

c) a pair of elongated brace members, one for each said skid, pivotably attached to said trailer, situated to pivot toward a generally horizontal position for travel and to pivot to extend between said frame and said skid to support said frame from the ground when said skid is lowered;

d) means to support and secure said skid aft end to said frame in a generally horizontal position for travel.

\* \* \* \* \*